(12) United States Patent
Luhr et al.

(10) Patent No.: US 7,278,642 B2
(45) Date of Patent: Oct. 9, 2007

(54) SNOW SLED

(75) Inventors: Stephen H. Luhr, Ferrisburg, VT (US);
Richard A. Luhr, Ferrisburg, VT (US);
Timothy Bachman, St. Paul, MN (US);
Francis Mahoney, Barre, VT (US);
Thomas C. Meier, Richfield, MN (US);
Frank Phillips, Evergreen, CO (US);
Christian R. Trifilio, St. Paul, MN (US)

(73) Assignee: Cool Front, Inc., Ferrisburg, VT (US)

( * ) Notice: Subject to any disclaimer, the term of this patent is extended or adjusted under 35 U.S.C. 154(b) by 327 days.

(21) Appl. No.: 10/955,400

(22) Filed: Sep. 30, 2004

(65) Prior Publication Data

US 2005/0073117 A1 Apr. 7, 2005

Related U.S. Application Data

(60) Provisional application No. 60/507,842, filed on Oct. 1, 2003, provisional application No. 60/510,325, filed on Oct. 10, 2003.

(51) Int. Cl.
*B62B 13/12* (2006.01)

(52) U.S. Cl. ...................... 280/22.1; 280/16
(58) Field of Classification Search ............... 280/7.12, 280/7.14, 11, 15, 16, 18, 25, 21.1, 22.1, 28, 280/28.12, 28.16
See application file for complete search history.

(56) References Cited

U.S. PATENT DOCUMENTS 2,446,452 A  8/1948 Benson ................. 280/22
4,101,142 A * 7/1978 Turner .................. 280/16
4,262,919 A * 4/1981 Krent ................... 280/16
4,591,173 A * 5/1986 Marier ................ 280/21.1
4,591,174 A * 5/1986 White .................. 280/28
4,682,781 A * 7/1987 Dickens ................ 280/22
5,413,361 A * 5/1995 Mosher ............... 280/7.12
5,551,714 A * 9/1996 Rauf et al. ............. 280/18
5,836,594 A * 11/1998 Simmons ............... 280/28
6,035,901 A   3/2000 Stumpf et al. .......... 139/419
6,386,634 B1  5/2002 Stumpf .............. 297/300.4
6,540,950 B1  4/2003 Coffield ............... 264/257
2003/0038436 A1  2/2003 Fireman ................ 280/21.1

OTHER PUBLICATIONS http://www.emscogroup.com/public_html/sledsnewpage/xsldpage.htm; XSleds; Emsco Group; printed Jun. 17, 2003.

* cited by examiner

*Primary Examiner*—Frank Vanaman
(74) *Attorney, Agent, or Firm*—Downs Rachlin Martin PLLC

(57) ABSTRACT

A snow sled (100) comprising a seating portion (116) that includes a lightweight space frame (104) having a suspension-type seat (108) stretched among the space frame. The sled further includes a steering portion (120) and an articulated steering mechanism (112) that links the steering portion to the seating portion. The articulated steering mechanism allows the steering portion to be pivoted laterally relative to the seating portion so as to make the sled readily steerable. A pair of rear skis (164, 168) are removably attachable to the seating portion. The steering portion (120) includes a ski support (200) and a pair of front skis (204) pivotably attached to the ski support. Chatter and movement of the front skis are dampened by a pair of boots (228) that engage the ski support and the respective front skis.

11 Claims, 14 Drawing Sheets

SNOW SLED

RELATED APPLICATION DATA

This application claims the benefit of priority of U.S. Provisional Patent Application Ser. No. 60/507,842, filed Oct. 1, 2003, and titled "Snow Sled," that is incorporated by reference herein in its entirety, and U.S. Provisional Patent Application Ser. No. 60/510,325, filed Oct. 10, 2003, and titled "Snow Sled," that is incorporated by reference herein in its entirety.

FIELD OF THE INVENTION

The present invention generally relates to the field of sports and recreational equipment. In particular, the present invention is directed to a snow sled having features that enhance the steerability, performance, safety and comfort of the sled.

BACKGROUND OF THE INVENTION

Snow sleds have been used for many years for recreational purposes. Most current snow sleds have numerous limitations that generally make them suitable only for kids, or very limited use. These sleds are typically inexpensive and are generally uncontrollable, slow and/or heavy, which can also make them inherently dangerous. Additionally, current sleds are usually large and uncomfortable and can only be adequately used under certain types of snow conditions, such as packed powder. These limitations have not been adequately addressed in the snow sled market.

SUMMARY OF THE INVENTION

In one aspect, the present invention is directed to a snow sled for use by a person on snow. The sled comprises a frame having a lower portion operatively configured to slide on the snow and an upper portion defining an open region. A membrane is stretched among the frame in the open region so as to support the person when the sled is in use.

In another aspect, the present invention is directed to a snow sled for use by a person on snow. The sled comprises a seating portion that includes a first lower portion operatively configured to slide on the snow and an upper portion having a membrane for supporting the person when using the sled. A steering portion formed separately from the seating portion has a second lower portion operatively configured to slide on the snow. A steering mechanism couples the seating portion and the steering portion with one another and allows the steering portion to move substantially pivotably relative to the seating portion.

In a further aspect, the present invention is directed to a snow sled for use by a person on snow. The sled comprises a seating portion having a lower portion and an upper portion having a membrane operatively configured for supporting the person while using the sled. At least one removable ski operatively configured to slide on the snow engages the lower portion of the seating portion such that the removable ski engages the snow when the sled is in use.

In a further aspect, the present invention is directed to a snow sled. The sled comprises a seating portion having a lower end operatively configured to slide on snow and a steering portion, operatively connected to the seating portion, comprising at least one ski having a length and first and second sides extending the length and spaced from one another, the ski including a recess that extends substantially along the entire length and substantially from the first side to the second side, the recess facing the snow when engaging the snow.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE INVENTION

Referring to the drawings, FIGS. 1-8 illustrate a sled 100 of the present invention. In general, sled 100 includes a number of features that enhance its performance and provide physical comfort to a rider (not shown). For example, sled 100 may include a space frame 104 that permits the sled to be relatively lightweight yet provide significant strength and rigidity. Sled 100 may additionally include a suspension-type seat 108 that not only contributes to a lightweight design, but also enhance the comfort of the rider during use. Further, sled 100 may be provided with an articulated steering mechanism 112 that enhances the maneuverability of the sled. Finally, sled 100 is modular which means most of the components can be easily removed for replacement without special tools. These and other features of a sled of the present invention, such as sled 100, are described below in detail.

Sled 100 may include a seating portion 116 and a steering portion 120 linked together by a steering mechanism 112.

Seating portion 116 may include space frame 104, which may comprise one or more elongate members, such as members 124, 128. Members 124, 128 may be made of a lightweight material, such as aluminum, titanium or a carbon fiber composite, among others. In addition, members 124, 128 preferably, but not necessarily, have a tubular configuration. Members 124, 128 may be joined to one another using any suitable type of connection, such as a welded connection, bonded connection or mechanically-fastened connection, among others. Those skilled in the art will appreciate the various types of materials, configurations and connections that may be used, such that exhaustive lists need not be provided for those skilled in the art to appreciate the broad scope of the present invention.

Members 124, 128 may have any desired cross-sectional shape, such as circular, rectangular or oval, among others. Although only two members 124, 128 are illustrated, those skilled in the art will appreciate that, depending upon the configuration of each member and the overall configuration of frame 104, more or fewer members may be used. Tubular members 124, 128 may also be of applicable size to accept accessories 132 (FIG. 4) normally used for bicycles, such as lights, horns, bells, mirrors and water bottles, among others. Those skilled in the art will understand how to attach these accessories, e.g., using techniques known in the bicycle manufacturing industry. In other embodiments, frame 104 may not be made of tubular members 124, 128, but rather another type of structure. For example, frame 104 may be a monolithic plastic molding. Frame 104 may generally define an opening 136 that may or may not extend vertically through the entire frame. In other embodiments (not shown), opening 136 may be part of a recess that does not extend completely through frame 104.

Seating portion 116 of sled 100 may further include seat 108 located generally within opening 136. Seat 108 may comprise a membrane 140 stretched among various portions of frame 104, e.g., among portions of frame members 124, 128. Membrane 140 may be made of a lightweight fabric, film or combination of the two, among other things. In one embodiment, membrane 140 may comprise thermoplastic fibers, or reinforcing filaments, woven with filler material. Membrane 140 may include a seating surface 144 where a user sits or lies while using sled 100. It is noted that seat 108 need not be of a suspension-type in other embodiments. Rather, seat 108 may comprise one or more other members (not shown) that work primarily in bending and/or compression, rather than primarily in tension as occurs in membrane 140. If seat 108 is a suspension-type seat, membrane 140 may be stretched, or preloaded, so as to provide the desired suspension characteristics. Seat 108 may be similar in construction to the construction used to make certain types of chairs, bicycle seats and automobile seats. This type of construction is disclosed generally in, e.g., U.S. Pat. Nos. 6,035,901, 6,386,634 and 6,540,950, which are incorporated herein by reference.

Depending upon the design of seat 108, membrane 140 may be attached to one or more support attachments 148 that either attach directly to frame 104 as shown, or are configured to engage one or more connecting members (not shown) that connect each support attachment to the frame. In the embodiment shown, each support attachment 148 is made of a semirigid thermoplastic material sewn to membrane 140. In alternative embodiments, each support attachment 148 may be more or less rigid, made of a different material, made of an elastomeric material, and/or secured to membrane 140 by other means. For example, each support attachment 148 may be secured to membrane 140 by adhesive bonding or mechanically using a channel and spline-type connection. Each support attachment 148 may include a loop portion 152 looped around a corresponding respective tubular member 124, 128 and folded back onto, and attached to, itself, such as by mechanical interlock 156 (FIG. 4), e.g., with studs and grommets, rivets, meltbonding, adhesive bonding or other means.

Figure 1:
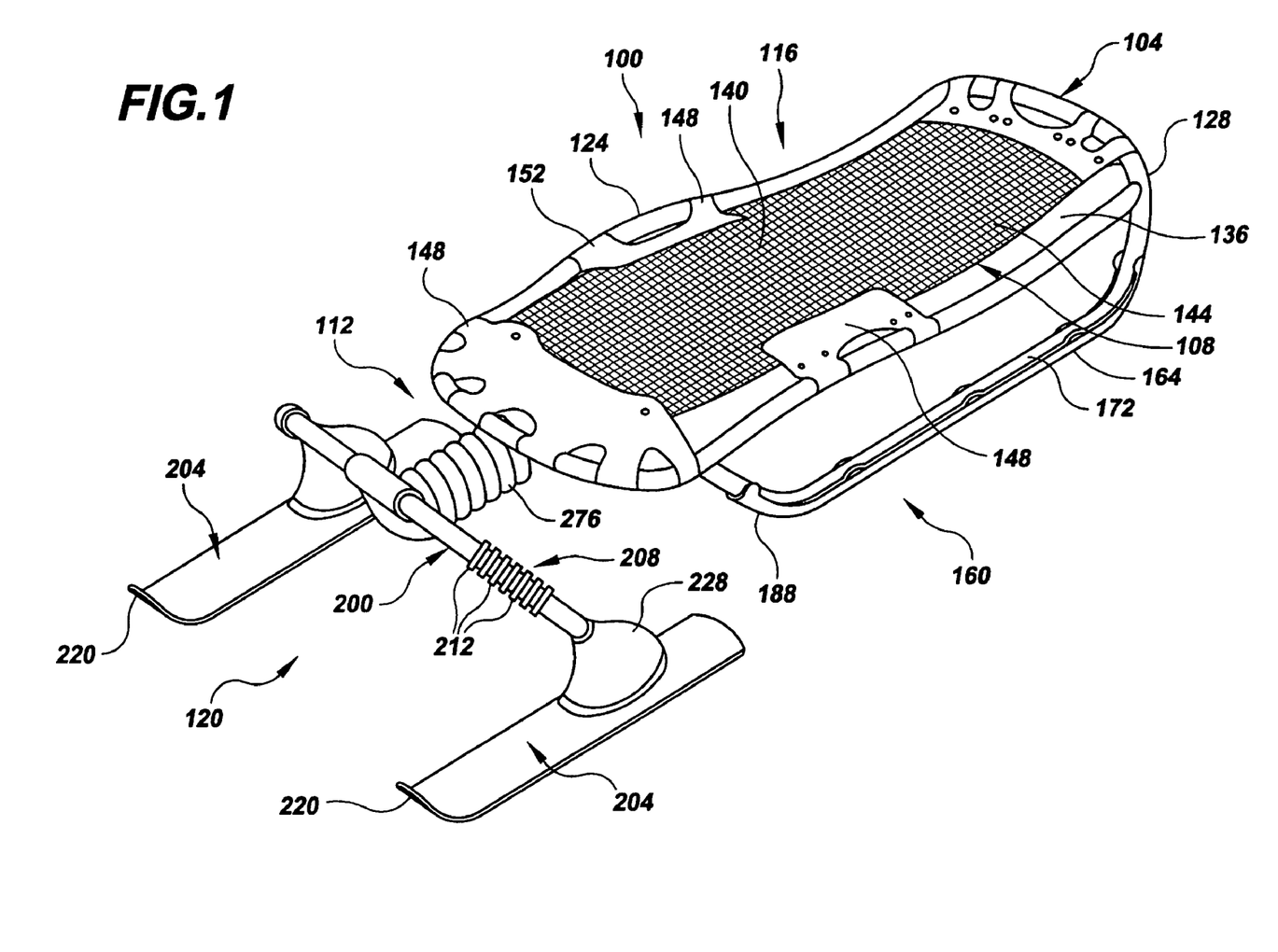
FIG. 1 is a perspective view of a snow sled of the present invention.
Figure 2:
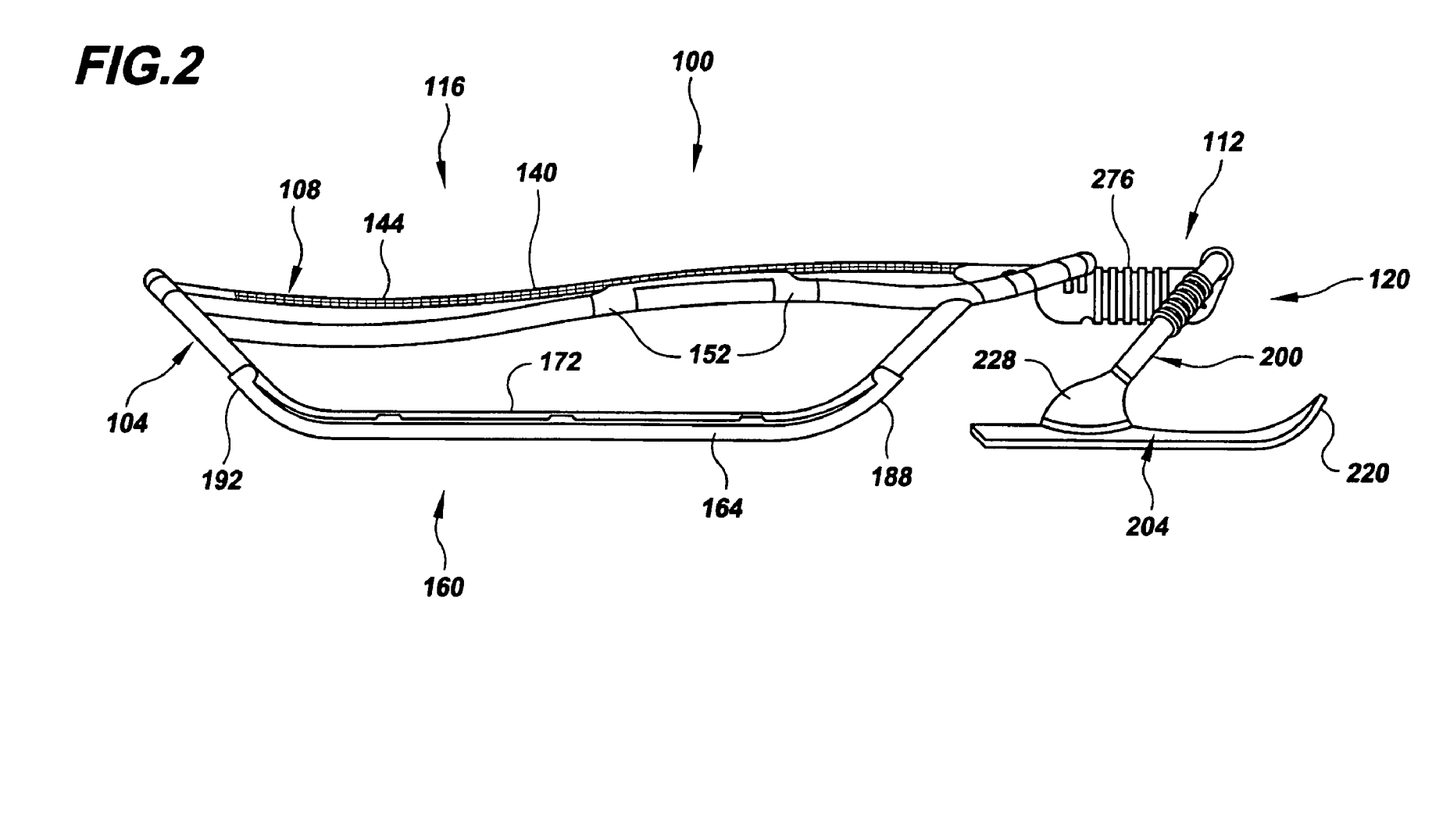
FIG. 2 is a side elevational view of the sled of FIG. 1.
Figure 3:
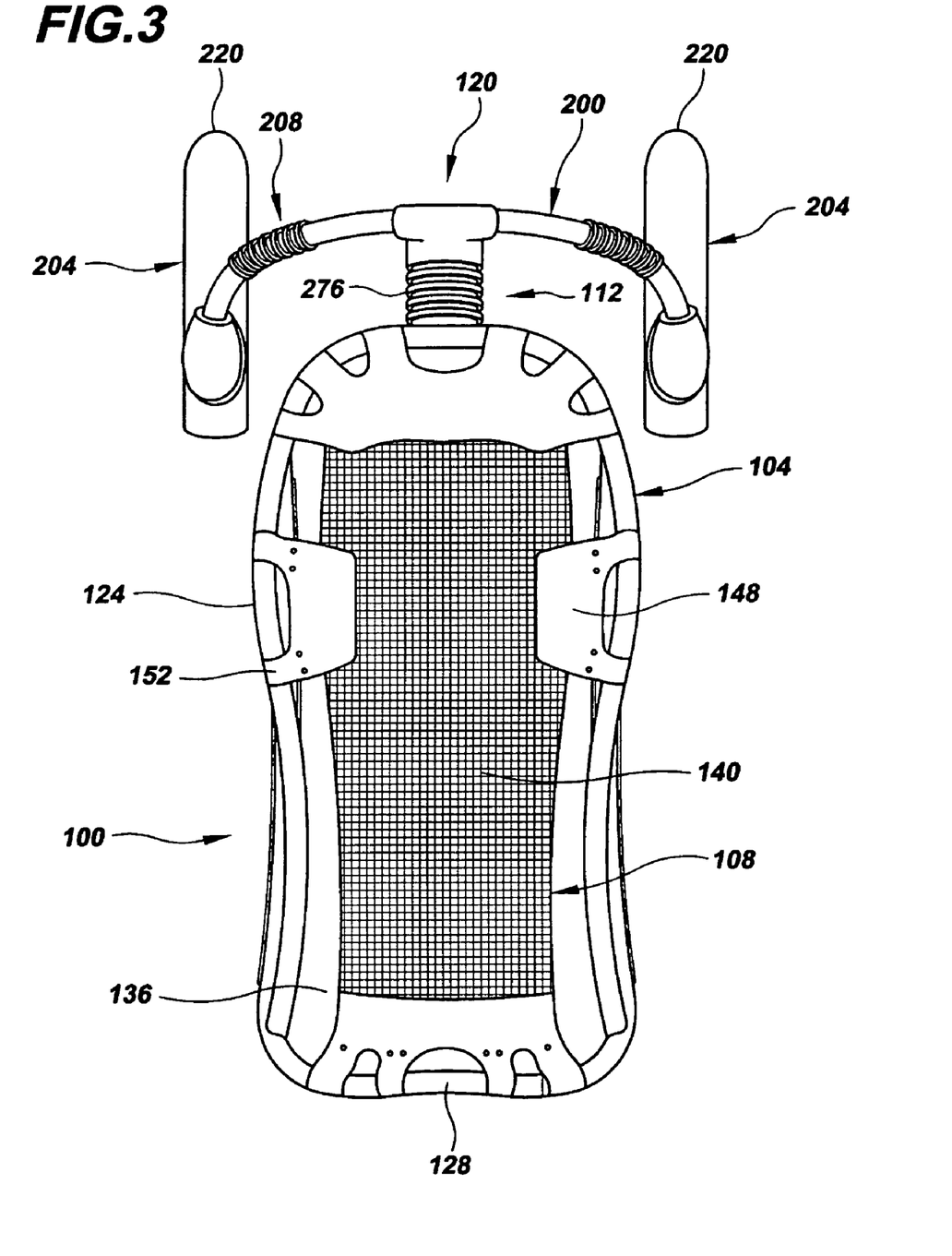
FIG. 3 is a plan view of the sled of FIG. 1.
Figure 4:
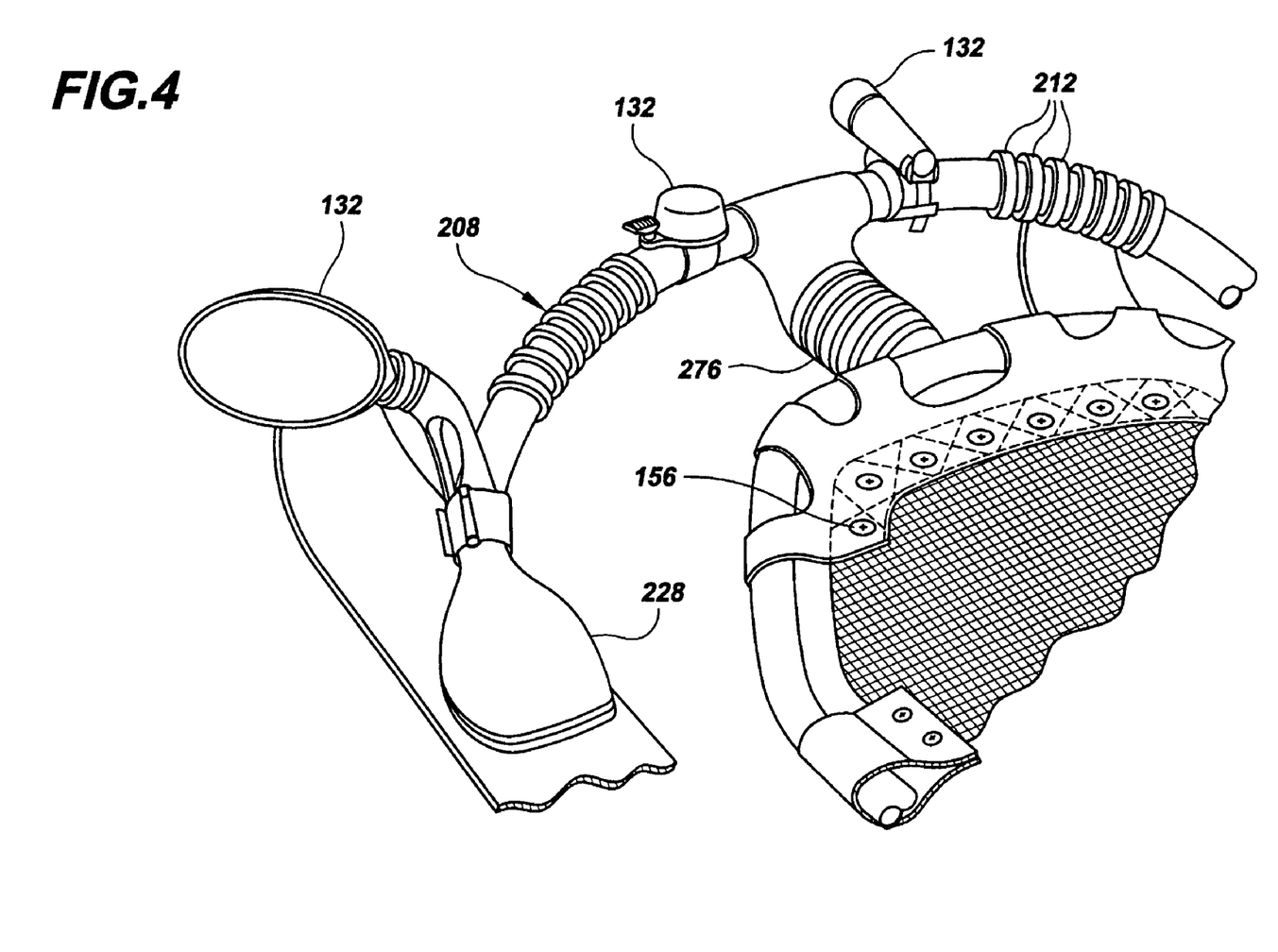
FIG. 4 is an enlarged perspective partial view of the sled of FIG. 1 showing some accessories attached thereto.
Figure 5:
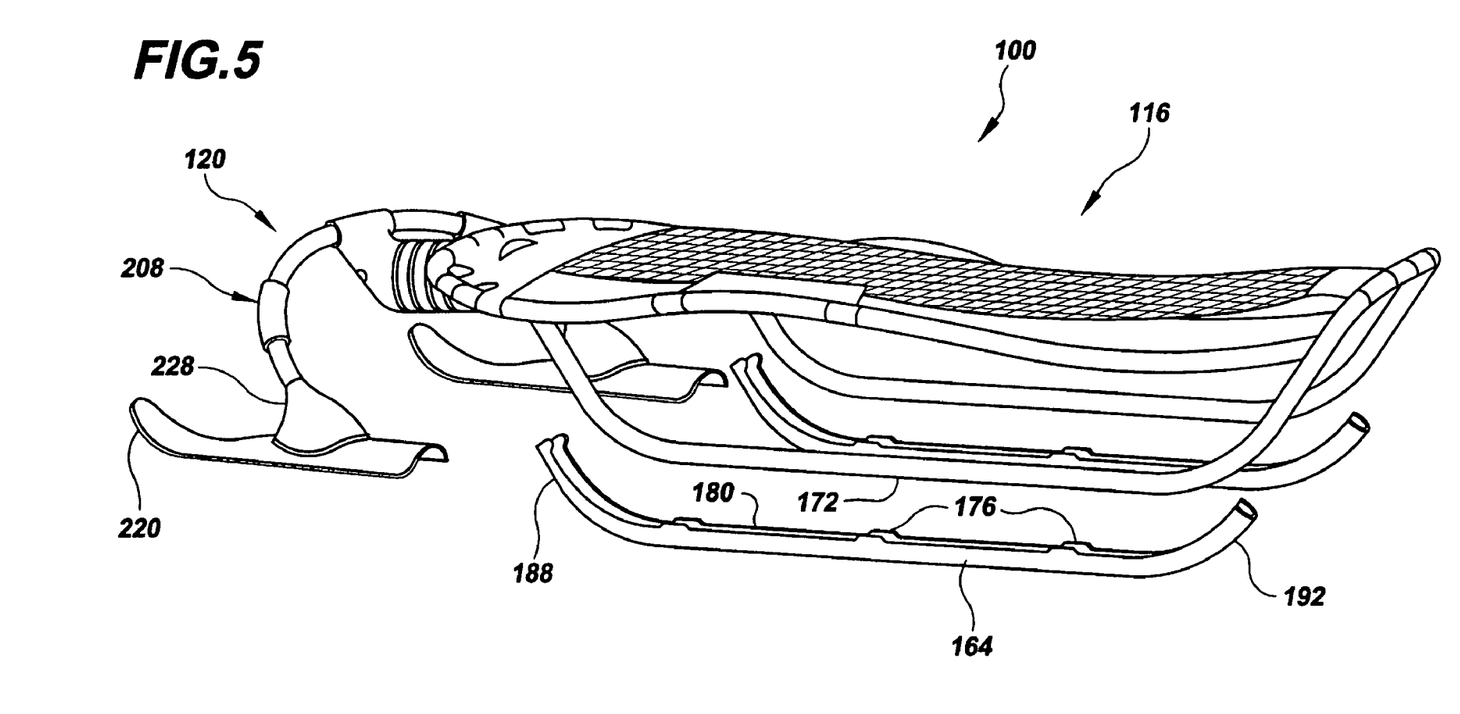
FIG. 5 is a partially exploded view of the sled of FIG. 1.
Figure 6:
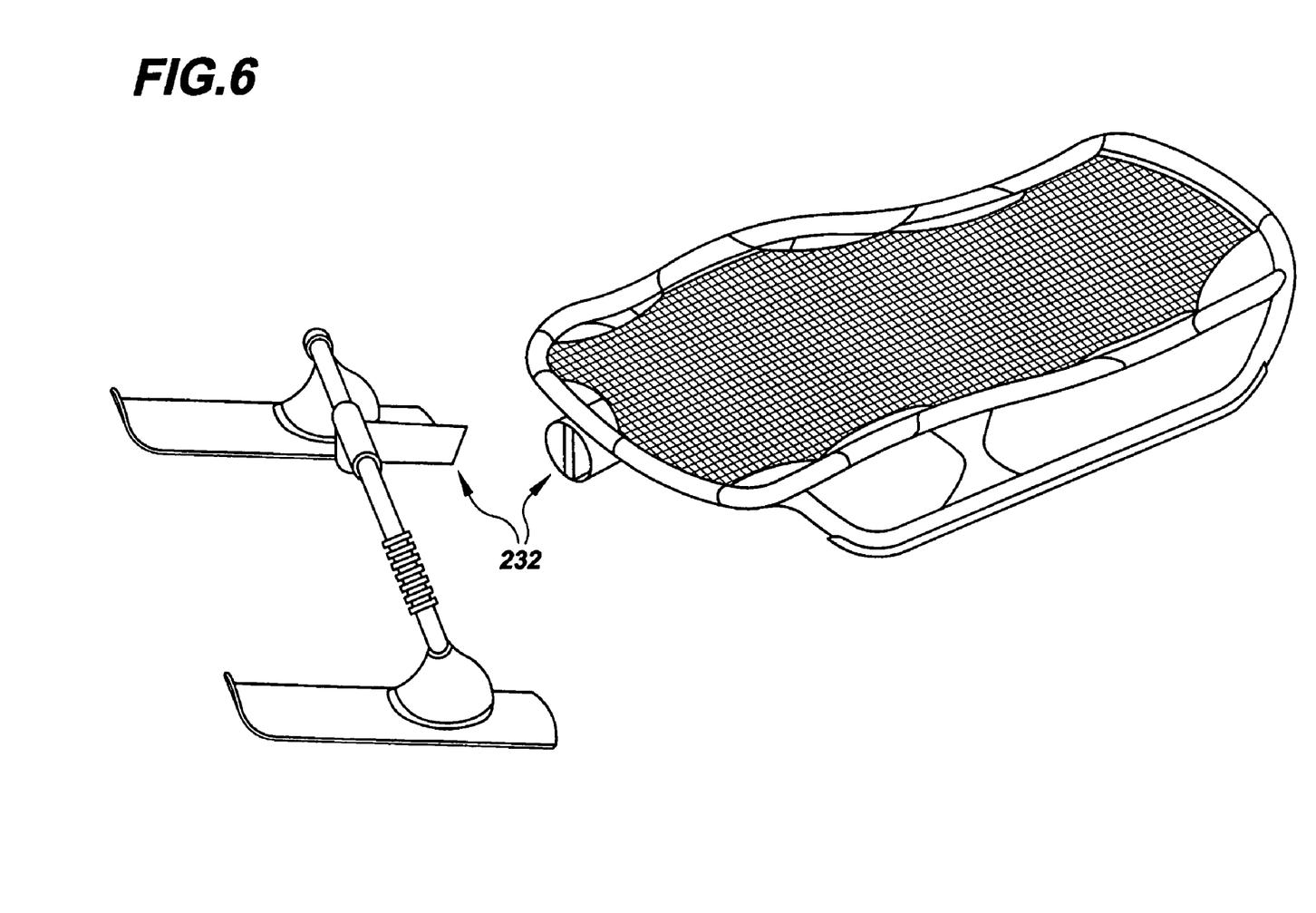
FIG. 6 is an enlarged perspective view of the sled of FIG. 1 showing the steering portion detached from the seating portion and without the protective boot over the steering linkage.
Figure 7:
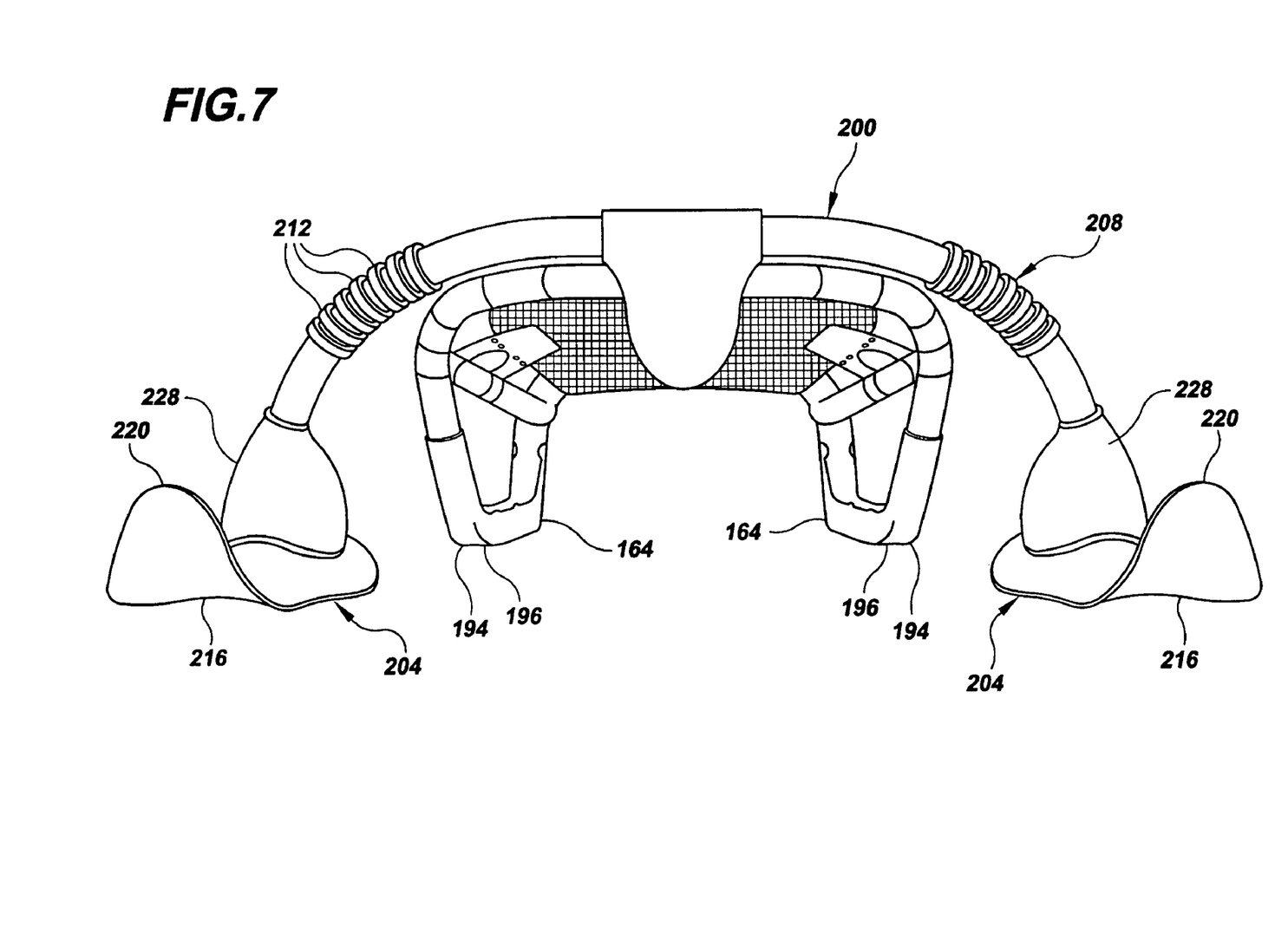
FIG. 7 is an enlarged perspective front view of the sled of FIG. 1.
Figure 8:
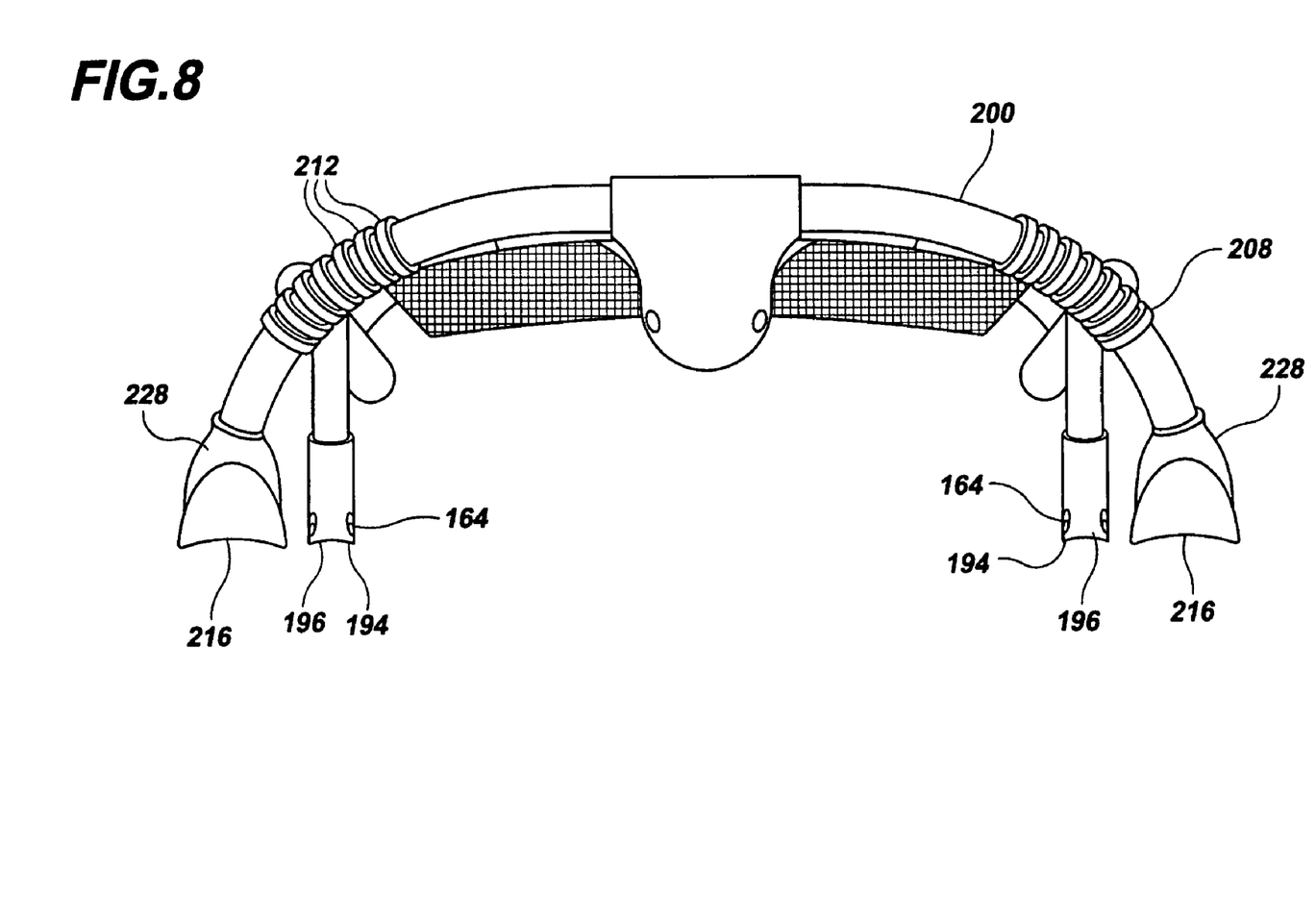
FIG. 8 is an enlarged front elevational view of the sled of FIG. 1.
Figure 9:
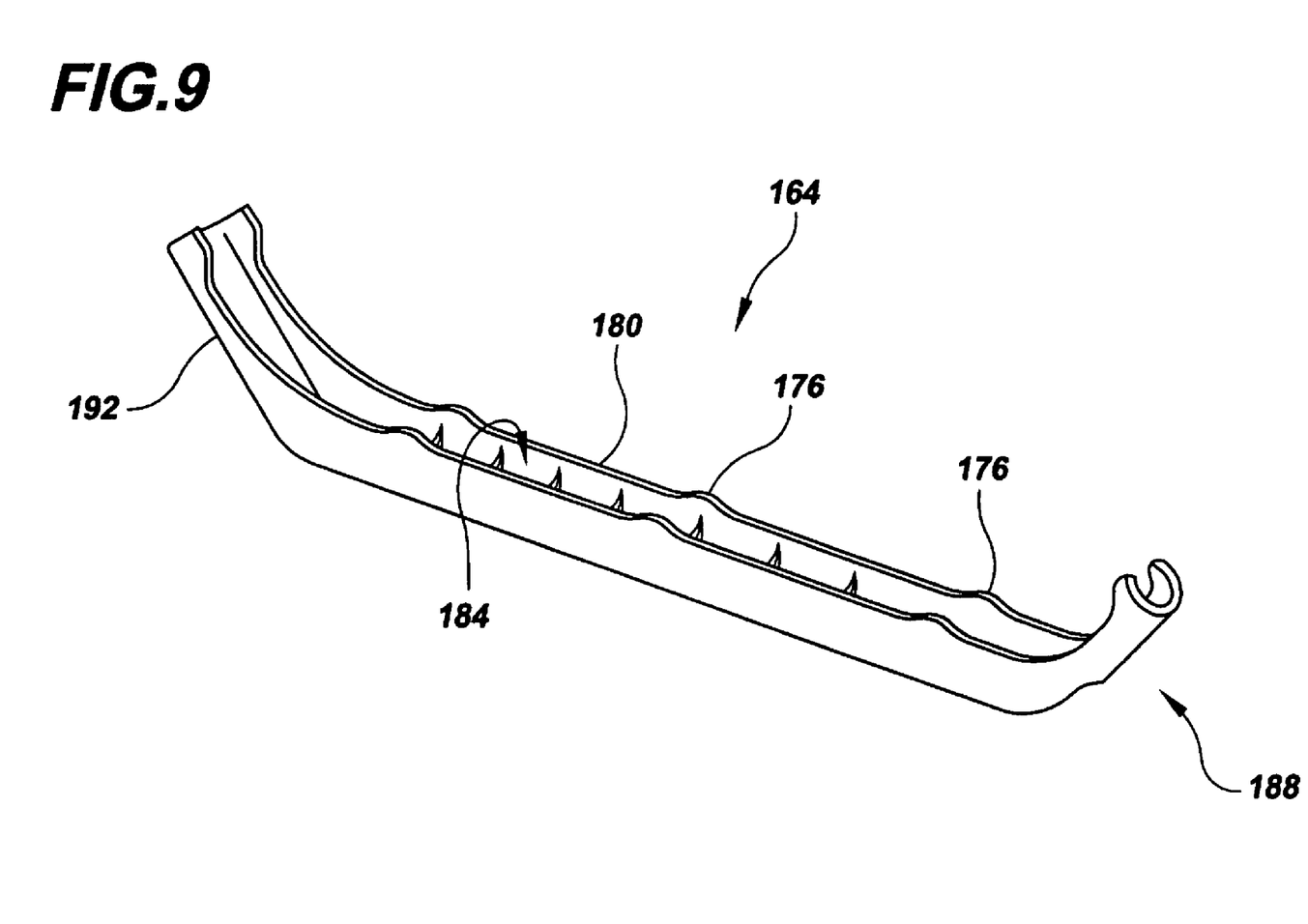
FIG. 9 is an enlarged perspective view of a rear ski of the present invention usable with the sled of FIG. 1.
Figure 10:
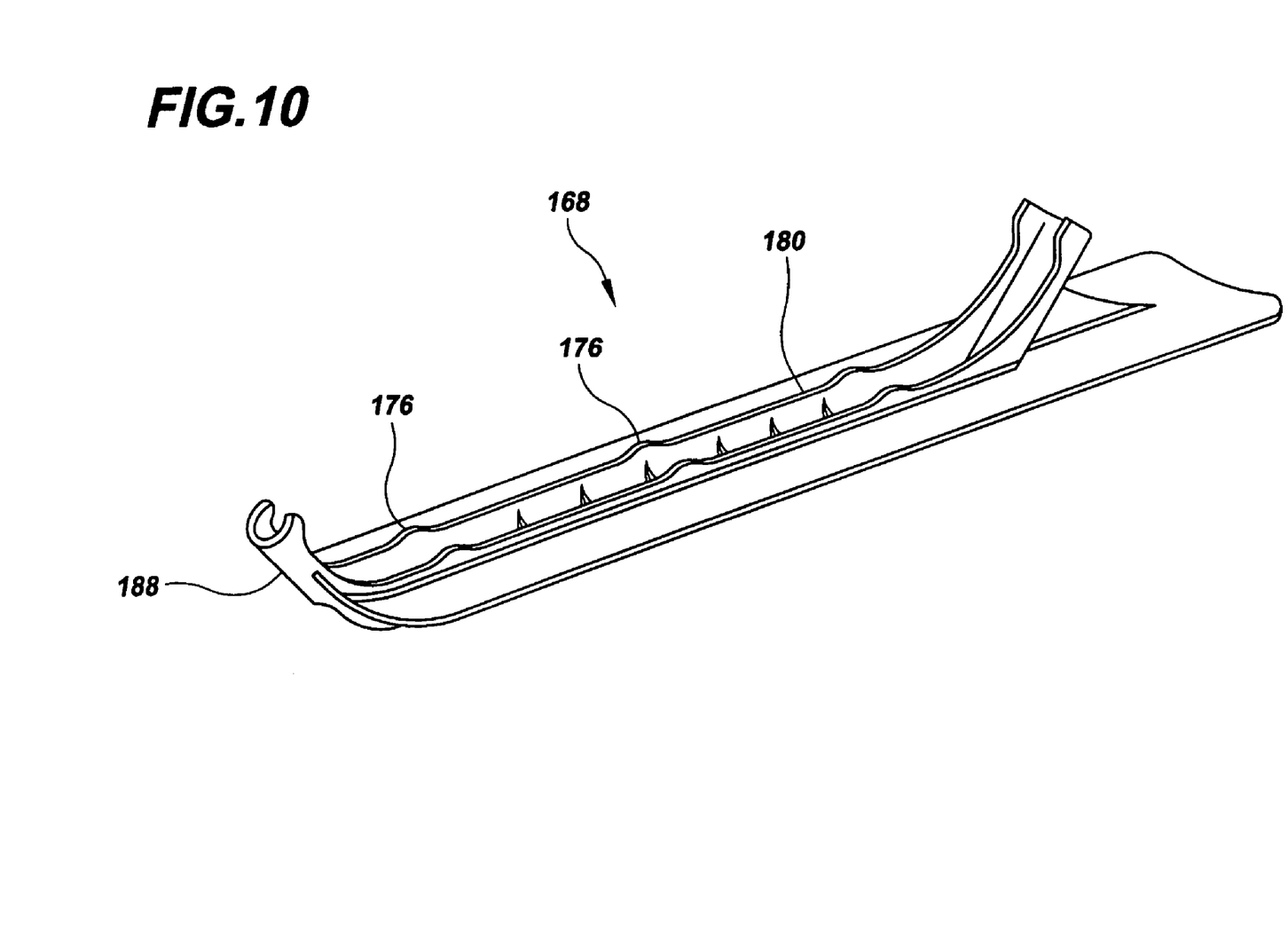
FIG. 10 is an enlarged perspective view of an alternative rear ski of the present invention usable with the sled of FIG. 1.

Referring to FIGS. 1, 2, 5, 7 and 8, and also to FIG. 9, a lower portion 160 of seating portion 116 may include one or more skis 164 designed for sliding on snow. Each ski 164 may be configured to be readily detachable from frame 104 for the ease of replacement with new skis or alternative skis designed, e.g., for use in a different snow condition. For example, ski 164 may be particularly designed for hard-packed snow, whereas an alternative type of ski, e.g., ski 168 of FIG. 10, may be designed for unpacked powder snow. In the present embodiment, each ski 164, 168 is configured for quick mounting on corresponding respective portions 172 of member 128 using a plurality of interference-type clips 176 and an overbite 180 created by the ski conformally engaging the cylindrical shape of member 128 more than half of the circumference of the cylindrical shape. Those skilled in the art will readily appreciate that other types of quick connect means may also, or alternatively, be used. Of course, skis 164, 168 may be fixedly attached to frame 104 or integral with the frame in other embodiments.

Regarding skis 164, each such ski may include a central longitudinal recess 184 for conformally receiving corresponding respective portion 172 of second tubular member 128. Each ski 164 may include an upturned leading end 188 and an upturned trailing end 192 for enhancing the performance of the ski in various snow conditions. Each ski 164 may have a concave snow-engaging surface 194 extending substantially along the entire length and width of the ski. Each ski 164 may further include one or more strakes (not shown) on its snow-engaging surface 196 to increase the maneuverability and controllability of sled 100. Skis 164 may be made of any suitable material, such as plastic, wood, metal or fiber reinforced composite, among others. High-density polyethylene and ultra-high molecular weight polyethylene are two types of plastic suitable for making skis 164 due to their low sliding resistance on snow and durability, among other characteristics. Each ski 164 may further include patterned textures (not shown) on its snow-engaging surface 196 to decrease sliding resistance and/or increase the maneuverability and controllability of sled 100.

As shown in FIGS. 1-8, steering portion 120 may include a ski support 200 and one or more skis 204 operatively attached to the ski support. Ski support 200 may be configured, and/or made of one or more materials, to match frame 104 of seating portion 116, if desired. For example, as shown, frame 104 is made of metal tubular members 124, 128. Accordingly, ski-support 200 may likewise be made of one or more tubular metal members. Of course, if frame 104 were made of a monolithic plastic molding, ski support 200 may similarly be made of a suitable monolithic plastic molding. Ski support 200 may include foot/hand rests/grips 208 where a user may rest his/her feet or grip with his/her hands during use and may apply the necessary forces for steering sled 100 during use. Foot/hand rests/grips 208 may be made of a suitable material, e.g., rubber or plastic, and may include ribs 212 or other structures for inhibiting sliding of a user's feet or hands on the foot/hand rests/grips. Steering of sled 100 is discussed below.

Referring to FIGS. 7, 8, 11 and 12, each ski 204 may have a concave snow-engaging surface 216 extending substantially along the entire length and width of the ski. Each ski 204 may further include one or more strakes (not shown) extending along snow engaging surface 216 to enhance the lateral grip of that ski during steering conditions. Each ski 204 may also include patterned textures (not shown) on its snow engaging surface 216 to decrease sliding resistance and/or increase the maneuverability and controllability of sled 100. Each ski 204 may include an upwardly-turned leading end 220 and an upwardly-turned trailing end (not shown) for enhancing the performance of the ski in various snow conditions. Like rear skis 164, front skis 204 may be made of any suitable material, such as plastic, wood, metal or fiber reinforced composite, among others. High-density polyethylene or ultra-high molecular weight polyethylene may be particularly desirable. In addition, skis 204 may be configured so as to be readily replaceable with new skis and/or skis (not shown) designed for a different snow condition.

Figure 11:
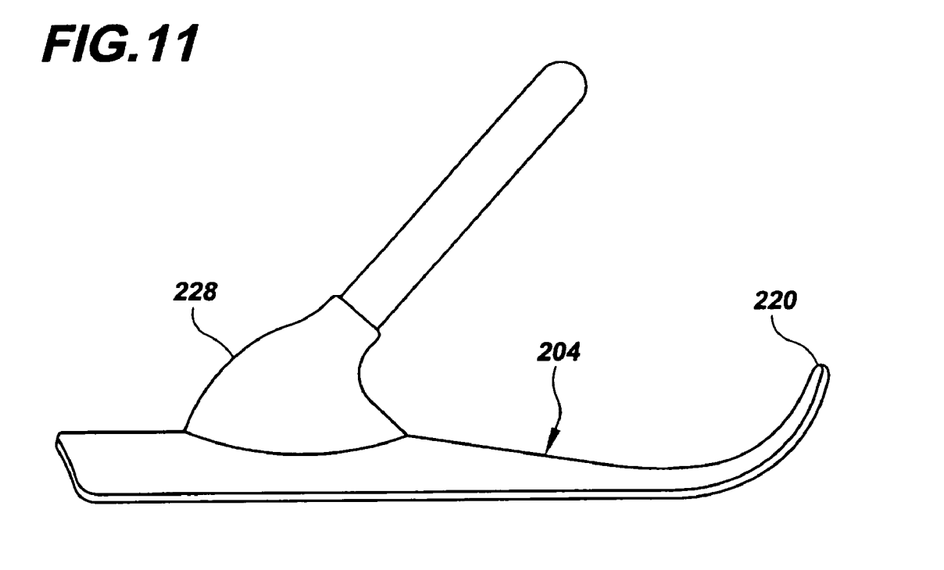
FIG. 11 is an enlarged partial side elevational view of the steering portion of the sled of FIG. 1.
Figure 12:
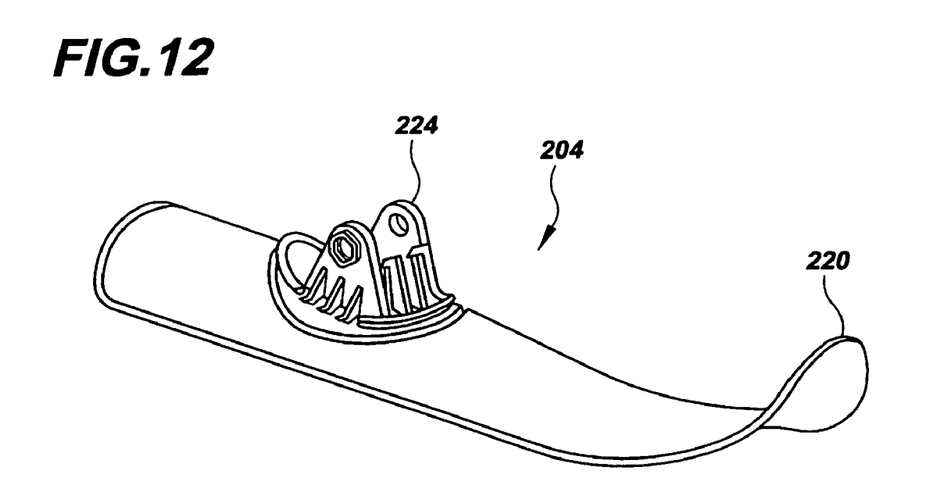
FIG. 12 is a perspective view of the ski of the steering portion of FIG. 11.

Each ski 204 may be pivotably attached to a corresponding respective end of ski support 200 with a pivot joint 224 so that the ski may pivot in a substantially vertical plane within a limited range of motion relative to the ski support. Each pivot joint 224 may be covered with a suitable protective boot 228 that keeps snow and/or ice from interfering with the pivoting action of the respective ski 204. The protective boot 228 may also dampen movement of ski 204 relative to the respective ski support 200 and reduce chatter of ski 204 against snow. The dampening and reduction of chatter are due, in part, by the resilient stiffness of the boot 228. Boot 228 may be made of any suitable material, such as rubber, plastic, metal mesh or other flexible material. The end of each ski support 200 may include an end cap (not shown) to dissipate and evenly distribute pressure on pivot joint 224.

Steering mechanism 112 generally couples steering portion 120 to seating portion 116 and allows the steering portion 120 to be pivoted laterally relative to the seating portion 116 so as to make sled 100 readily steerable. Although steering mechanism 112 may take many forms, FIGS. 13 and 14 particularly illustrate steering mechanism 112' that is presently preferred. Steering mechanism 112' may include a steering linkage 232 rigidly connected to ski support 200 of steering portion 120. Steering linkage 232 may be configured to provide a relatively large stiffness in a vertical direction and a relatively small stiffness in a horizontal direction, i.e., side-to-side relative to seating portion 116. Such a configuration permits a user to readily pivot steering portion 120 relative to seating portion 116 by deflecting linkage 232 toward one side of sled 100 or the other, while permitting little flexing of the linkage in a vertical plane. Such a configuration also provides for shock absorption due to torque and twisting of the steering linkage 232 as sled 100 engages uneven or rough terrain.

Figure 13:
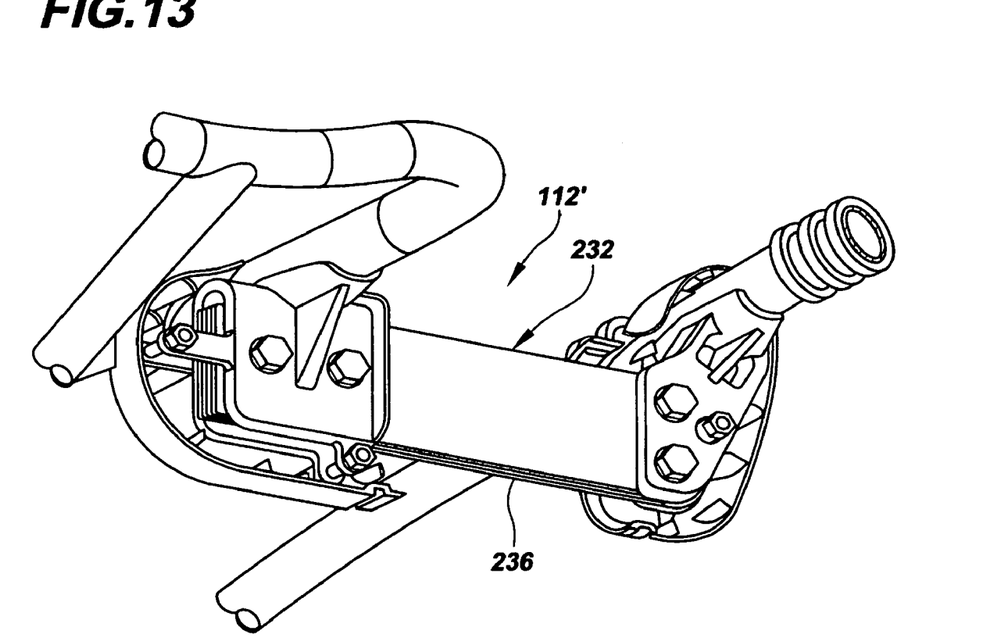
FIG. 13 is an enlarged cutaway view of a steering mechanism of the present invention usable with the sled of FIG. 1.
Figure 14:
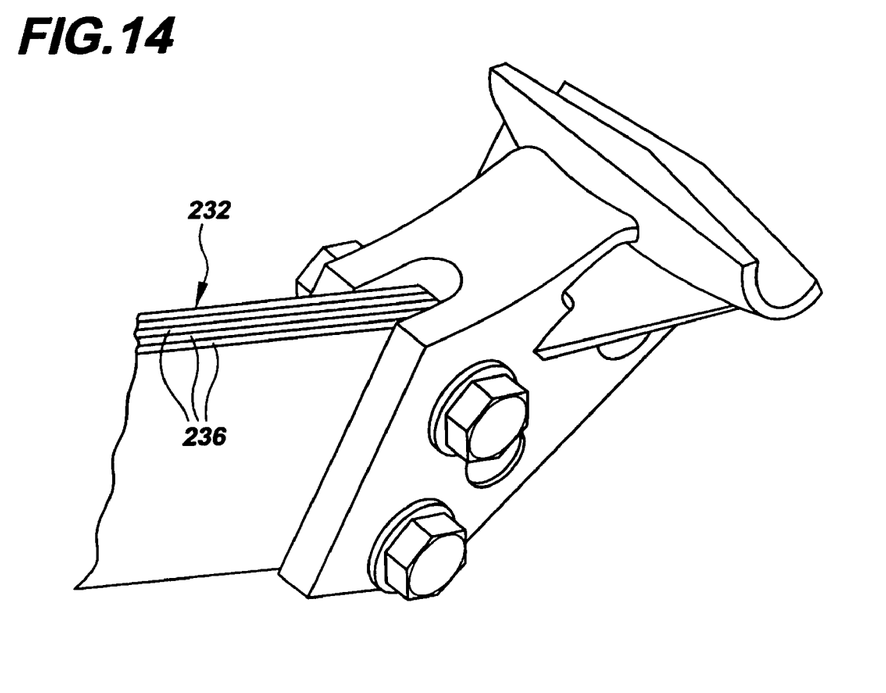
FIG. 14 is an enlarged partial view of the steering mechanism of FIG. 13.

One configuration of linkage 232 that provides high vertical stiffness and low horizontal stiffness is a sandwich of members, such as plates 236, having a relatively large moment of inertia in the vertical direction and a relatively small moment of inertia in the horizontal direction. The resistance of the linkage 232 in the horizontal plane may be provided by the inherent stiffness of plates 236, as well as the friction of the plates as they slide against one another when the steering portion 120 is pivoted laterally. When plates 236 are made of steel, the sandwiching of the plates has been found to reduce the likelihood that the plates will become permanently deformed in the event that excessive force is applied to the steering portion 120 while turning sled 100. Plates 236 may alternately be made of any suitable material other than steel that is resiliently flexible over the maximum anticipated range of motion of steering portion 120 relative to seating portion 116. In addition, the sandwiched members need not be flat plates 236, but rather may have any shape such that the members can be stacked, sandwiched or nestled with one another.

Figure 15:
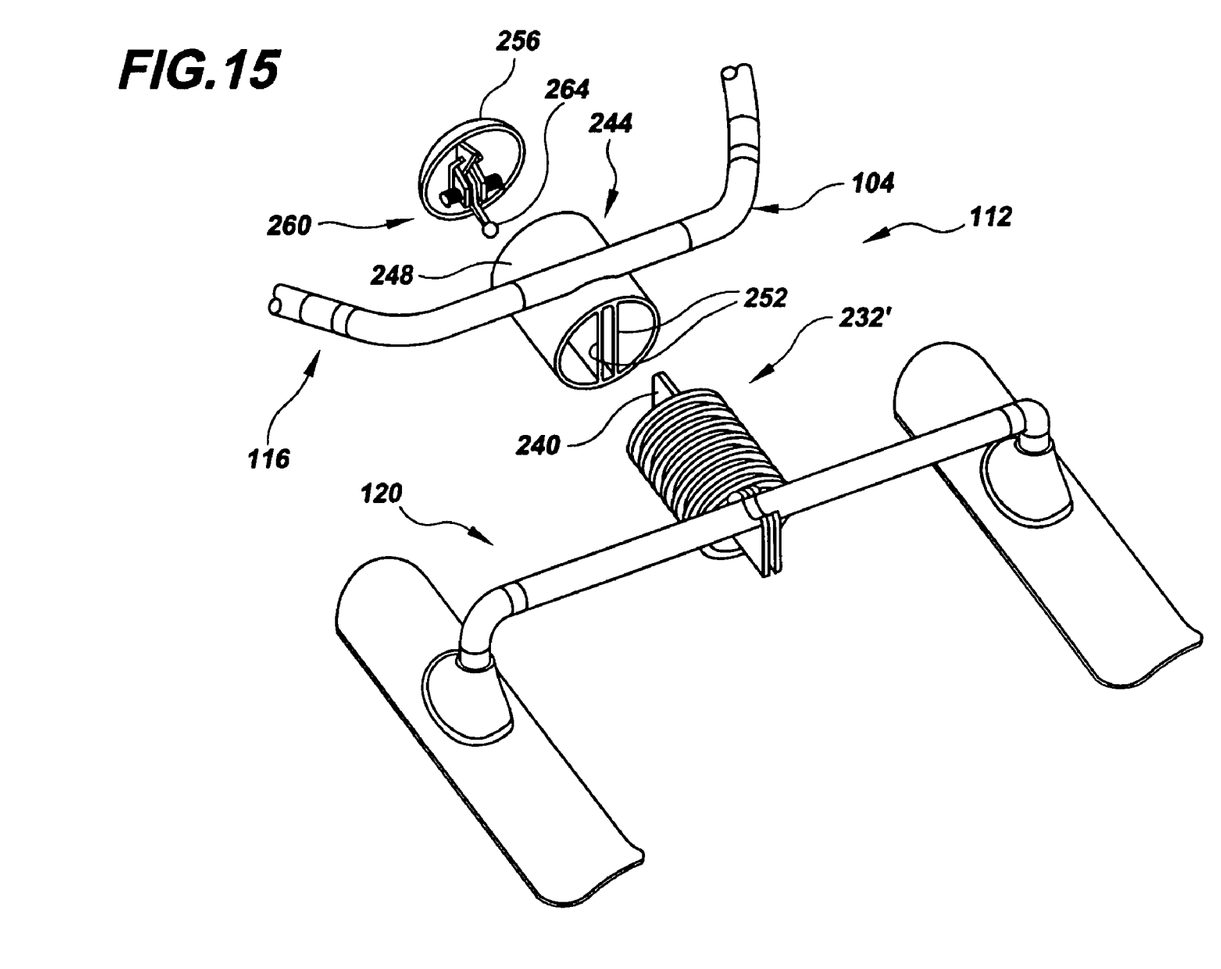
FIG. 15 is an enlarged exploded view of an alternative steering mechanism of the present invention usable with the sled of FIG. 1.
Figure 16:
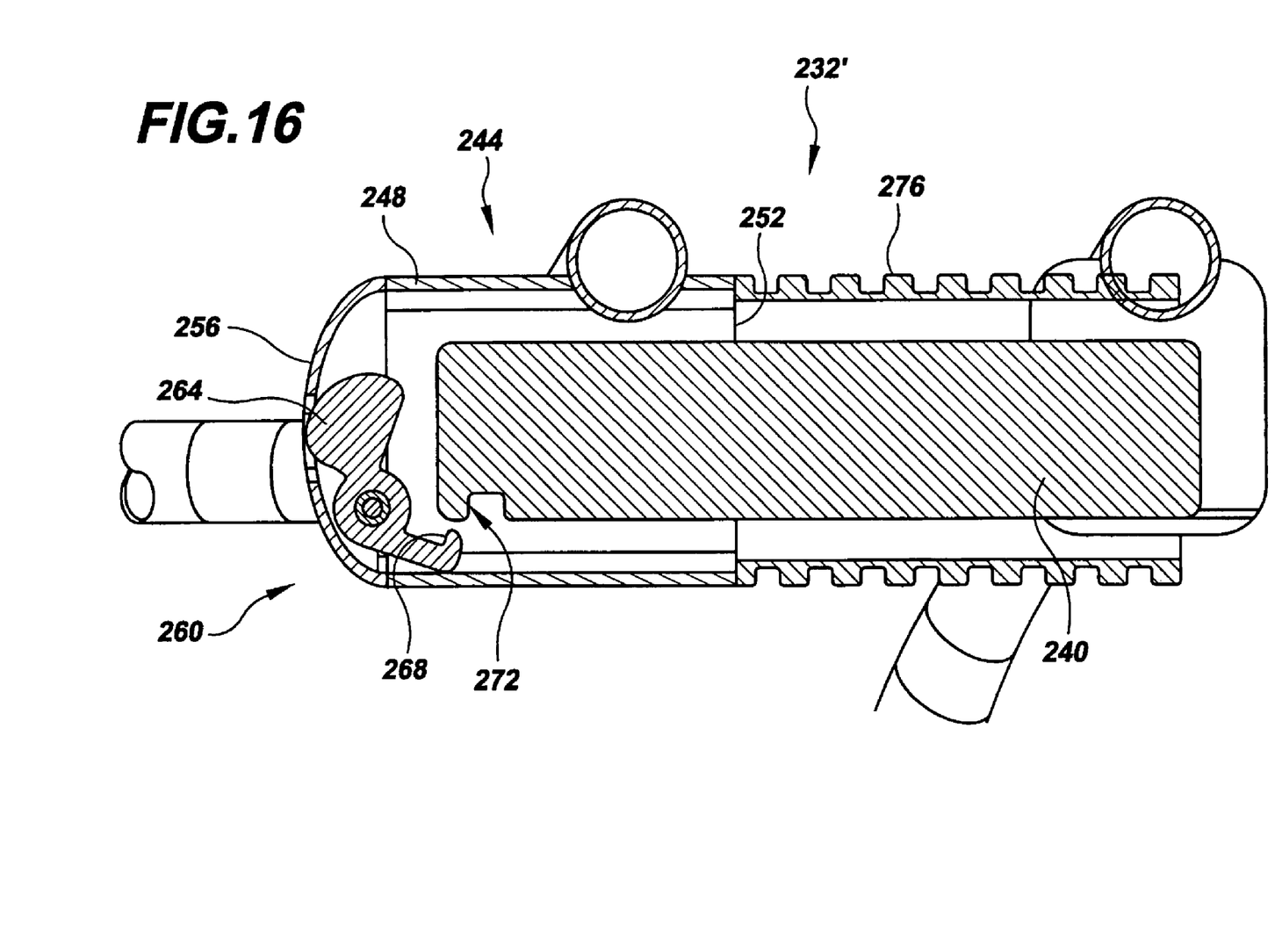
FIG. 16 is an enlarged cross-sectional view of the steering mechanism of FIG. 15.

An alternative to linkage 232 that also provides high vertical stiffness and low horizontal stiffness is a linkage 232' that includes a cantilever bar 240, as shown in FIGS. 15 and 16 in connection with steering linkage 112. Cantilever bar 240 may have a relatively large moment of inertia in the vertical direction and a relatively small moment of inertia in the horizontal direction. Cantilever bar 240 may be made of any suitable material that is resiliently flexible over the maximum anticipated range of motion of steering portion 120 relative to seating portion 116. Examples of such materials include stainless steel, tungsten, spring steel, plastic, wood and fiber-reinforced composites, among others. The stiffness and strength of the cantilever bar 240 allows the horizontal width of the steering linkage 232' to be a fraction (one-tenth or less) of the horizontal width of steering portion 120 and the horizontal width of seating portion 116. In one embodiment wherein cantilever bar 240 is a stainless steel bar about 8 inches long, the thickness of the bar is on the order of about 3/32 inch to about 1/4 inch and the height of the bar is on the order of about 1 to about 2 inches. Of course, the dimensions of steering linkage 232' will vary depending upon such factors as design weight capacity of sled 100 (FIG. 1), weight distribution between front skis 204 and rear skis 164, length of the steering linkage 232' and desired response of the steering linkage, among others.

Steering mechanism 112 may further include a receiver 244 connected to frame 104 of seating portion 116 for receiving steering linkage 232'. Receiver 244 may be configured to removably receive steering linkage 232' and/or to allow the length of the steering linkage extending from the receiver to be adjusted. Varying this length allows a user to adjust the lateral stiffness of steering linkage 232' to make the steering response either tighter or looser to suit, among other things, the strength and comfort of the user and snow, trail and sledding style conditions. Of course, receiver 244 may alternatively be attached to steering portion 120 and steering linkage 232' rigidly attached to seating portion 116.

Receiver 244 may include a housing 248 containing a pair of lateral supports 252 spaced apart by a distance slightly larger than the width of cantilever bar 240, or another steering linkage (not shown) such as a steering linkage similar to sandwiched plates 236 of FIGS. 13 and 14, so as to snugly receive the cantilever bar or other steering linkage. Lateral supports 252 inhibit rotation of cantilever bar 240 or other steering linkage, and hence steering portion 120 of sled 100, relative to seating portion 116. Receiver 244 may further include a rear cap 256 and a latch assembly 260 for removably securing cantilever bar 240 or sandwiched plates 236 within the receiver. Latch assembly 260 may include a pivotable latch 264 having a catch 268 that is engagable with a corresponding catch 272 on cantilever bar 240 or sandwiched plates 236 to hold the cantilever bar or sandwiched plates in place. Alternative means for securing steering linkage 232' or other steering linkage to receiver 244 include a pin, snap, bolt or clamp, among others. In an embodiment wherein the extension of steering linkage 232' can be varied, the steering linkage may contain a plurality of apertures (not shown) spaced apart along its length. Correspondingly, receiver 244 may include a removable pin (not shown) that a user can disengage from one aperture and engage into another aperture so as to change the extension of steering linkage 232' from the receiver. Those skilled in the art will appreciate the variety of means that may be used to hold steering linkage 232' in receiver 244 and/or allow a user to adjust the length of the steering linkage extending from the receiver. Steering linkage 232' may be protected by a boot 276, such as a bellows-type boot, made of, e.g., rubber, plastic, metal mesh or other flexible material to inhibit snow and/or ice from accumulating in steering mechanism 112.

In alternative embodiments, seating portion 116 may include a rear receiver (not shown) for receiving a coupling link for linking sled 100 (FIG. 1) to the steering receiver 244 of the seating portion of a similar second sled so as to link the second seating portion to the first sled. This can be accomplished by removing steering portion 120 from the second sled and linking the corresponding seating portion 116 to the rear receiver of the first sled. As many seating portions 116 as desired can be linked together and with a lead sled 100 in such a manner. The rear receiver may be any suitable receiver, such as a conventional hitch, e.g., a pin-type or ball-type hitch. In this case, the coupling link would be configured for engaging the hitch at one end and steering receiver at the other end. In other embodiments, the rear receiver may be similar to steering receiver 244. In this case, the coupling link would have opposing ends configured to engage to the two like receivers. For example, in the embodiment of receiver 244 described above wherein latch 264 engages catch 272 on cantilever bar 240, a suitable coupling link would have a like catch at each of its ends.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A snow sled for use by a person on snow, comprising:
   (a) a seating portion that includes a first lower portion operatively configured to slide on the snow and an upper portion having a membrane for supporting the person when using the sled, said seating portion comprising a tubular frame;
   (b) a steering portion formed separately from said seating portion and having a second lower portion operatively configured to slide on the snow, said steering portion comprising:
   (i) a tubular member that includes a first end and a second end and a seconed end spaced from said first end; and
   (ii) first and second skis attached to said tubular member at corresponding respective ones of said first and second ends; and
   (c) a steering mechanism coupling said seating portion and said steering portion with one another and allowing said steering portion to move substantially pivotably relative to said seating portion.

2. A snow sled according to claim 1, wherein said steering mechanism includes a plurality of sandwiched members.

3. A snow sled according to claim 2, wherein said sandwiched members provide lateral steering resistance.

4. A snow sled according to claim 3, wherein said lateral steering resistance is provided at least in part by friction between the sandwiched members.

5. A snow sled according to claim 1, wherein said steering mechanism includes a cantilever bar.

6. A snow sled according to claim 1, wherein said steering mechanism includes a steering linkage removably engaging at least one of said seating portion and said steering portion.

7. A snow sled according to claim 6, wherein at least one of said seating portion and said steering portion includes a receiver removably receiving said steering linkage.

8. A snow sled according to claim 7, wherein said receiver further comprises a latch mechanism for holding said steering linkage in said receiver.

9. A snow sled according to claim 1, wherein said tubular member includes hand/foot grips.

10. A snow sled according to claim 1, wherein said steering mechanism includes a steering linkage protected by a protective boot.

11. A snow sled according to claim 1, wherein said seating portion has a first width and said steering mechanism includes a steering linkage having a second width in the direction of said first width that is no more than one-tenth said first width.

* * * * *